July 19, 1932. W. F. HENDERSON ET AL 1,868,203
SAUSAGE CASING AND METHOD OF PREPARING THE SAME
Original Filed April 14, 1926
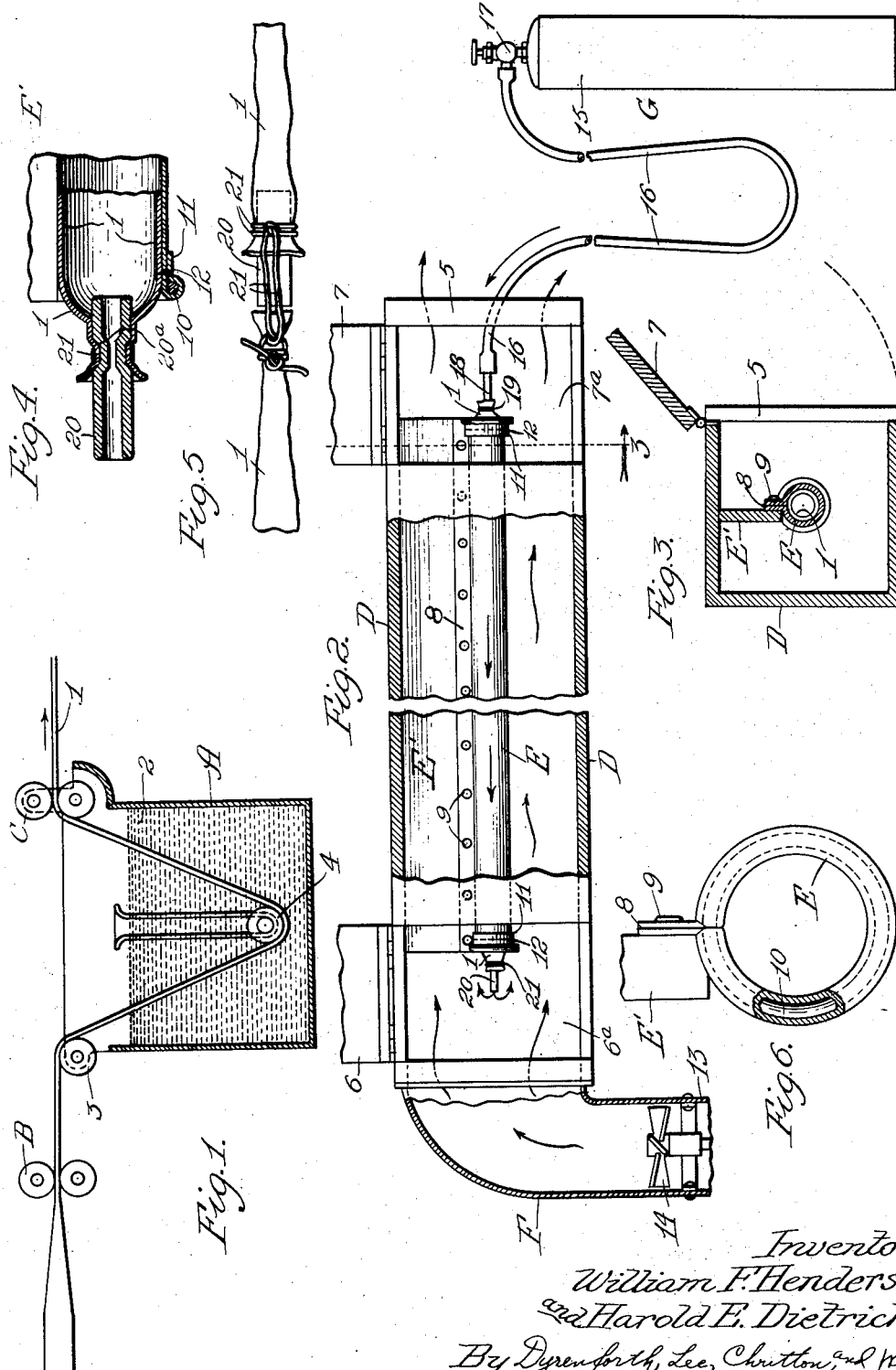
Inventors:
William F. Henderson
and Harold E. Dietrich,
By Dyrenforth, Lee, Chritton and Wiles
Attys.

Patented July 19, 1932

1,868,203

UNITED STATES PATENT OFFICE

WILLIAM F. HENDERSON AND HAROLD E. DIETRICH, OF CHICAGO, ILLINOIS, ASSIGNORS TO THE VISKING CORPORATION, OF CHICAGO, ILLINOIS, A CORPORATION OF VIRGINIA

SAUSAGE CASING AND METHOD OF PREPARING THE SAME

Original application filed April 14, 1926, Serial No. 101,958. Divided and this application filed August 12, 1926. Serial No. 128,886.

The present invention relates particularly to animal intestine sausage-casings and a method of preparing the same.

The primary object of the invention is to produce animal casings which can be readily kept in good condition and which can be used with great facility in the sausage-stuffing operation. In accordance with the usual practice in the art, hanks of casings, tied together, are preserved in salt, or salt water; and when these casings are to be used, it is necessary to untie the hanks, soak out the salt, and run water through the casings to straighten them out and distend them sufficiently to permit them to be used. By the improved method described herein, the objectionable practice is overcome, time and expense are saved, and the work of handling the casings is much more conveniently performed.

The present application constitutes a division of our application 101,958, filed April 14, 1926 (Patent 1,612,508, December 28, 1926).

In accordance with the present process, the animal casings are soaked and washed, if necessary; the casings are then treated with a fluid adapted to introduce an ingredient of hygroscopic character into the casings; and the casings are then dried. After drying, the casings may be shirred upon a paper tube, if desired; and when the stuffing operation is to be performed, the paper tube may be slipped onto the horn of the stuffing machine and the casing may be paid out from the horn of the machine as the stuffing operation proceeds.

The accompanying drawing illustrates apparatus suitable for carrying out the casing-treating process, which is designed to provide a finished sausage-casing which can be immediately filled with meat, or which can be kept in storage for an indefinite period without deterioration and stuffed to meet requirements.

In the drawing, Fig. 1 represents a vertical sectional view of apparatus for immersing a casing in a suitable solution adapted to introduce a hygroscopic agent into the casing, the solution employed being preferably a dilute solution of glycerin; Fig. 2, a broken vertical sectional view of suitable drying apparatus; Fig. 3, a vertical transverse sectional view taken as indicated at line 3 of Fig. 2; Fig. 4, a broken sectional view of the advance end portion of the sausage-casing while it is inflated within a suitable confining tube; Fig. 5, a fragmentary view illustrating the manner in which the advance end of a wet casing may be secured to the rear end of a dried casing so that the wet casing will be drawn into the confining tube through the medium of the dried casing while the latter is being withdrawn from the confining tube; and Fig. 6, an end elevational view of the confining tube with a portion broken away.

In the illustration given, A designates a vat containing a fluid adapted to introduce an ingredient of hygroscopic character into the material of the sausage casing, which is designated 1, said fluid being preferably a 20% solution of glycerin and water; B designates a pair of rolls through which the casing is drawn from a purifying bath; and C designates a pair of rolls for expressing from the casing the excess glycerin solution as the casing emerges from the bath, which is designated 2. The casing is guided over a roll 3 and under a roll 4 in passing through the vessel A.

Also, in the illustration given, D designates a drying chamber which may be conveniently thirty-five to fifty feet in length; E, a casing-confining tube preferably composed of an open-weave fabric, such as voile, said tube being suspended from a strip-like support E' depending from the top-wall of the drying chamber; F, a blower device for circulating heated air through the chamber D; and G, means for inflating the casing 1 while it is within the confining tube E.

The drying chamber D may be of any suitable form and construction. In the illustration given, it is in the form of an elongated rectangular box having the blower F attached at one end and having the other end open, as indicated at 5. Near its ends, the box is provided at one side with doors 6 and 7 which may be lifted to provide openings 6ª and 7ª for convenience in introducing and removing the sections of sausage casing.

The casing-confining tube E preferably is formed from a strip of porous cloth which is folded upon itself and has its margins 8 secured to the supporting strip E' by means of tacks 9. The loop of cloth may be expanded into tubular form by means of rings 10 applied to the ends. The end portion of the cloth loop may be inserted through the ring and folded back over the ring, as indicated at 11, and stitched, as indicated at 12.

The blower F may receive a supply of dry warm air from any suitable source (not shown) with which the pipe 13 connects. The pipe 13 is shown fitted with a fan 14.

Any suitable pressure apparatus G may be employed for inflating the sausage casing. In the illustration given, an air pressure tank 15 communicating with a hose 16 through a valve 17 is shown. The hose 16 is fitted at its free end with a small tube 18. As shown in Fig. 2, the rear end of the sausage casing is collapsed upon the tube 18 and secured thereto in any suitable manner, as by means of a rubber band 19.

At the advance end, the sausage casing has inserted therein a small glass tube 20 having a constriction 20ª. The advance end of the casing is secured to the constricted portion of the tube by means of a string 21.

In Fig. 5, the left hand casing 1 is assumed to be a dry casing and the right hand tube 1 is assumed to be a wet casing. In the first instance, a casing may be introduced into the confining tube E by passing a lead-string through the confining tube and using it to draw the casing into the tube. After the tube has thus been introduced and dried, the pressure is released by disconnecting the tube 18 from the rear end of the casing. The dried casing then collapses, and the string 21 at the advance end of the fresh casing may be tied to the rear end of the dried casing, so that the dried casing may be used as a means for drawing the wet casing into the confining tube. It will be understood that each wet casing is preparatorily equipped with a tube 20 having a constriction therein; and it will be understood further that after the wet casing has been drawn into the confining tube, the pressure apparatus is connected with the rear end of the casing and employed to maintain a gentle inflating pressure within the casing while the casing is being dried. The tank 15 may receive a supply of dried moderately heated air from any suitable source, not shown.

In practice, it is preferred to have the confining tube E of slightly greater diameter than the diameter of the sausage casing as received from the vat A. After the casing has been introduced within the confining tube, it is subjected to gentle inflating pressure which preferably is such as to distend, or stretch, the tube slightly. The distention is limited, however, by the walls of the confining tube. The distending action is sufficient to remove the possibility of any folds, or wrinkles, in the casing.

The drying action takes place while the sausage casing is thus distended and confined, and tends to the production of a more uniform diameter than is ordinarily possessed by intestinal casings. This is the preferred method of preparing the casing. It is to be observed, however, that animal casings ordinarily are quite tough and, if desired, the use of a confining tube during the inflation and drying may be omitted.

As has been indicated, the excess glycerin solution is expressed from the casing by the rolls C as the casing is drawn from the bath 2. While the strength of the glycerin solution may vary within certain limits, it is preferred to use about a 20% solution. The purpose is to leave incorporated in or upon the casing, evenly distributed, a very small amount of glycerin after the drying operation. The very small percentage of glycerin which remains in the casing serves as a hygroscopic agent which attracts from the atmosphere sufficient moisture to keep the sausage casing pliable and moderately tough. On the other hand, it is desirable to avoid the use of too much glycerin, as the presence of too much glycerin would cause so much moisture to be attracted from the atmosphere as to be objectionable. Too much moisture attracted to the casings would tend to injure the keeping quality and would also tend to prevent the sausage casing from slipping readily from the horn during the stuffing operation.

When the dried sausage casing is removed from the drier, it contains substantially no free moisture. After the dried casing remains in the air for a short time, it becomes sufficiently moist to enable it to be used to best advantage in the stuffing operation. The moisture, however, is not sensibly present. That is, the casing does not feel wet, is pliable and moderately soft.

If desired, a section of casing of any desired length may be shirred upon a paper tube, such tube being adapted to be slipped upon the horn of a stuffing machine and fed readily therefrom during the stuffing operation. It is possible, for example, to load a tube about ten inches in length with perhaps thirty or forty feet of sausage casing.

The drying operation may be carried on by two operatives, one at each end of the drier. The doors 6 and 7 may be closed during the drying operation, and may be opened to enable the necessary manipulations to be made in withdrawing the dried casing and introducing a wet casing. It has been determined that a casing can be suitably dried by means of the apparatus shown, within a period of about one minute, moderately heated air being circulated through the drying chamber D. The use of an open-weave confining tube E permits the escape of moisture from the casing during the drying operation. While it is preferred to use a cloth tube, any suitable porous, or foraminous, confining tube may be employed.

The improved casing may, without injury, be compactly shirred upon a supporting tube adapted to be applied to a stuffer-horn; or the casings may be packaged in any other desired manner. The casing possesses such qualities that it will slip readily from the stuffer-horn.

When the casing, prepared as described above, is taken from storage, for use in the packing house, it is ready to be filled in the condition in which the packer receives it. Wet, or very moist casings, must be soaked up. Such an operation is unnecessary where the improved casings are used. As has been indicated, the improved casings lend themselves to the practice of mounting the casings on short dummy tubes which can readily be applied to stuffer-horns. This saves a great deal of time in the packing room. For example, where an animal intestine is used in accordance with the usual practice, more time is consumed in drawing the casing onto the horn than is used in stuffing the casing.

While it is preferred to employ a limiting tube for preventing undue distention of the casing, and producing a desirable uniformity in the drying operation, animal casings may be inflated and dried without the use of a limiting tube.

The improved casings may be used for producing sausages, wieners, etc. Regardless of the size of the product and the kind of stuffing material employed, whether meat or other material, these products are to be regarded as sausages within the terms of the appended claims.

The foregoing detailed description has been given for clearness of understanding only, and no unnecessary limitations should be understood therefrom, but the appended claims should be construed as broadly as permissible, in view of the prior art.

What we regard as new, and desire to secure by Letters Patent, is:

1. An animal intestine sausage-casing having incorporated therein, prior to removal of its natural water content, a hygroscopic agent to render said casing suitable for filling from a stuffer-horn without preliminary softening treatment.

2. An animal intestine sausage-casing having incorporated therein, prior to removal of its natural water content, a small percentage of glycerin to render said casing suitable for filling from a stuffer-horn without preliminary softening treatment.

3. An animal intestine sausage-casing, largely deprived of its natural water content, and having incorporated therein a hygroscopic agent which renders it soft and pliable, thereby adapting it for shirring on a stuffer-horn without preliminary softening treatment.

4. As a marketable product, an animal intestine sausage-casing, largely deprived of its natural water content, and containing a hygroscopic agent which renders it soft and pliable, thereby adapting it for filling from a stuffer-horn without further softening treatment.

WILLIAM F. HENDERSON.
HAROLD E. DIETRICH.